March 25, 1969  H. SULLHOFER  3,435,102
METHOD OF AND APPARATUS FOR MAKING COVERED PLATES
OF POLYURETHANE IN A CONTINUOUS PROCESS
Filed July 18, 1966
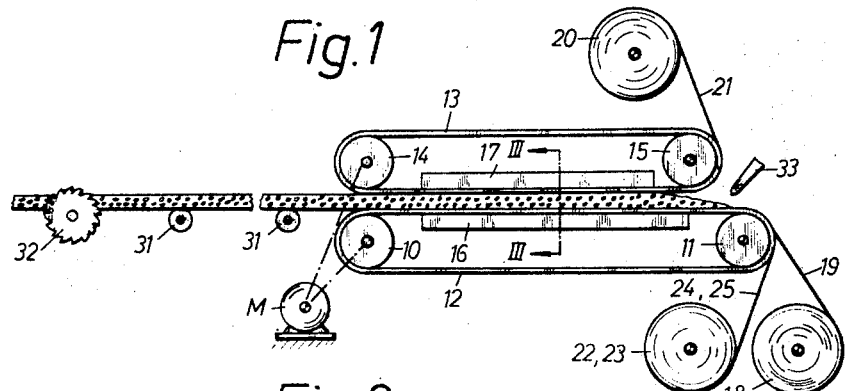
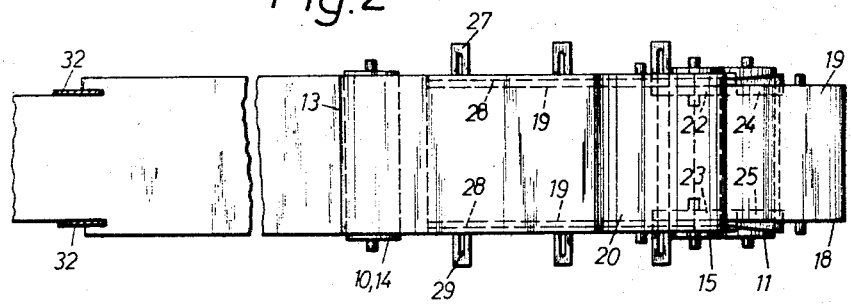
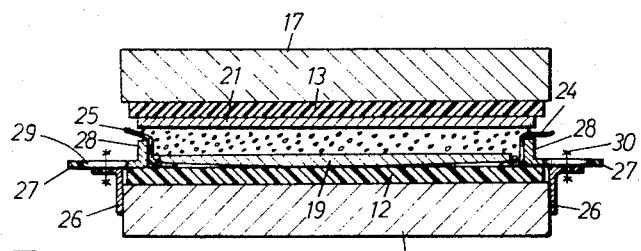
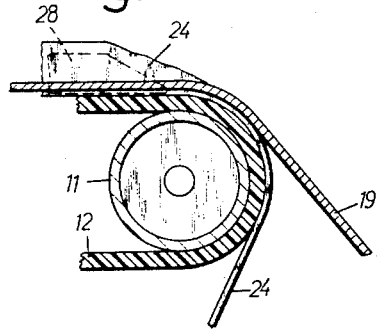
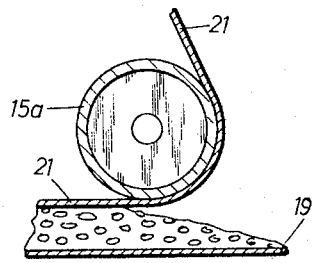

United States Patent Office 3,435,102
Patented Mar. 25, 1969

3,435,102
METHOD OF AND APPARATUS FOR MAKING COVERED PLATES OF POLYURETHANE IN A CONTINUOUS PROCESS
Heinz Sullhofer, Niederrheinstrasse 158, Dusseldorf, Germany
Filed July 18, 1966, Ser. No. 565,868
Claims priority, application Germany, July 22, 1965, S 98,366
Int. Cl. B29h 7/20
U.S. Cl. 264—47     10 Claims The present invention relates to a method of and an apparatus for making in a continuous process plates of polyurethane hard foam material which plates are covered on both sides thereof by a thin flexible foil. More specifically, the present invention concerns a method and apparatus of the type set forth according to which the said covered plates are made between two oppositely arranged conveyor belts of which those sections which face each other and are supported by plates define the chamber within which the hard foam material is being foamed.

A method of making in a continuous process endless plates, webs, or foils of foamable materials, especially of foam materials having a polyurethane basis, is known, according to which the reaction components after their combination are placed on a support moving at a speed corresponding to the reaction speed and are foamed. In this connection, the movable support consists of two conveyor belts which have those sections thereof which face each other supported by plates and define the chamber in which the foaming takes place. This limitation defines the thickness of the plate to be produced. The extension in the direction of the width is defined by inserted rubber bands, strips, or the like at both sides of the path of the foam material. At the two inner sides of the conveyor belts there are provided fabric webs of textile or other fiber material which are being withdrawn from supply rolls and which are transported by the conveyor belt. During this transport, between the foam material being formed and the said fabric webs, a firm adhesive connection takes place so that a foam material product is obtained which is covered on both sides of the fabric webs.

Although this method has been known for more than fourteen years; it has heretofore still been impossible to properly produce foam material plates covered on both sides, because the covering material always causes folds.

It has also been attempted to avoid this fold formation by subjecting the foam material during the foaming process between the supporting plates to particularly high pressures. However, these steps have merely resulted in squeezing out the folds and compressing the foam material so that a considerably higher specific weight up to 90 kg./m.³ and more has been obtained whereas non-compressed foam material has a specific weight of only 25 kg./m.³. Moreover, with this method the wear has considerably increased and the production costs have been greatly raised.

It is, therefore, an object of the present invention to provide a method of and apparatus for producing covered plates of polyurethane hard foam material in a continuous process which will overcome the above mentioned drawbacks.

It is another object of this invention to provide a method of and apparatus for producing plates of polyurethane hard foam material which are covered on both sides with a cover material while preventing the latter from forming folds.

It is still another object of this invention to provide a method and apparatus as set forth above for producing plates of polyurethane hard foam material which are covered on both sides and will yield such plates with a specific weight of approximately only 25 kg./m.³.

These and other objects and advantages of the invention will appear more clearly from the following specification in connection with the accompanying drawing, in which:

FIG. 1 diagrammatically illustrates a side view of an apparatus for carrying out the method according to the present invention.

FIG. 2 is a top view of FIG. 1.

FIG. 3 illustrates on a larger scale than that of FIGS. 1 and 2 a transverse section taken along the line III—III of FIG. 1.

FIG. 4 illustrates on a larger scale the inclined end faces of the supporting means.

FIG. 5 is a modification of the invention with a reversing roller.

The above outlined objects have been realized according to the present invention by respectively placing two narrow strips upon the two marginal portions of the lower conveyor belt while the lower foil by means of its marginal portions is placed on said narrow strips. Furthermore, the two foils and the marginal strips are during the foaming process freely movable between two supporting means fixedly connected at both sides with the lower supporting strip and are guided between said supporting means and the upper conveyor belt so that they can deviate. The marginal portions of the covered web are trimmed and the web is in a manner known per se cut to length.

In view of the free movability of the two cover foils and of the marginal strips between the lateral supporting means on the conveyor belts, the foils and strips can adapt themselves to the movement of the foam material to be formed. This means that the foils and strips move in the same way as the foam material moves. Consequently, no relative movements between the foam material and the cover material occur so that no folds can form. In view of the fact that the foam material can evade or freely move between the supporting means and the upper cover foil, a strong compression of the foam material will be avoided and a low specific weight will be obtained. It is a fact that the foam material will rise non-uniformly. In view of the high foaming ability already minor non-uniformities will when depositing the liquid reaction components, produce considerable differences in the direction of the height which cause the foam material to compact if the latter has no opportunity to evade or move freely. The marginal strips merely serve the purpose of preventing a sticking of the foam material to the lower conveyor belt and the lateral supporting means. The said strips are after completion of the foaming process partially cut off with the marginal portions of the covered web and partially dropped off. In view of the relatively low quantity of material employed in this process, the plates are particularly light and inexpensive.

With the device according to the invention for carrying out the above mentioned process, between the lateral supporting means and the upper conveyor belt there is left a narrow gap through which the excessive foam material can escape. The width of the gap is so selected that a certain pressure between the supporting plates will not be exceeded. In order to make sure that the lower cover foil can adapt itself to the movement of the foam material, said lower cover foil is arranged with play between the said supporting means.

According to a further feature of the invention, the upper foil is wider than the lower foil. In order to be able to produce plates of different width, the said supporting means are laterally displaceable and are for purposes of obtaining plates of different height exchangeable for higher or lower supporting means. The said supporting means may also be fixedly connected to the lower conveyor belt. In such an instance, however, it is necessary, when changing the width or height of the plate, to exchange the belt. Depending on the type of the covering material, it is possible to replace the upper conveyor belt by a reversing roller.

Referring now to the drawing, the apparatus shown therein comprises rollers 10 and 11 which are drivingly connected to a variable speed motor M so as to be able to be driven at various speeds. The said rollers 10 and 11 drive an endless conveyor belt 12 passing thereover. Above the conveyor belt 12 and in vertically spaced relationship thereto there is arranged a conveyor belt 13 which passes over rollers 14 and 15. Those sections of the conveyor belts 12 and 13 which face each other are supported by plates 16 and 17 which define the chamber in which the hard foam material is being foamed. The said supporting plates 16 and 17 are fixedly connected to the machine frame. The lower conveyor belt 12 withdraws a cover foil 19 from a supply roll 18. Such cover foil may consist for instance of a paper web. The upper conveyor belt 13 withdraws a cover foil 21 from a storage roll 20. Also in this instance the cover foil may consist of a paper web. The lower conveyor belt 12 additionally pulls a narrow strip each 24, 25 of crepe paper or the like from two supply rolls 22 and 23. These narrow strips 24 and 25 are placed upon the marginal portions of the lower conveyor belt 12 in such a way that the lower cover foil 19 will have its marginal portions rest thereon.

Mounted on the lateral surfaces of the lower supporting plates 16 are angle members 26 to which plates 27 of supporting means 28 are fixedly connected by means of oblong holes 29 and screws 30. The said supporting means 28 are arranged directly upon the lower conveyor belt 12 in spaced relationship to the upper cover foil 21 which is wider than the lower cover foil 19 so that between the said supporting means and the upper cover foil there will be formed a narrow gap. Furthermore, the supporting means 28 are also spaced from the lower cover foil 19 so that the latter will be freely movable between the said supporting means. Likewise rotatably journalled in the machine frame are supporting rollers 31 and cutting knives 32 by means of which the marginal portions of the foam material web is trimmed.

The finish mixed liquid foam material is by means of a spray head 33 as uniformly as possible deposited upon the lower cover foil 19. Those marginal portions of the lower conveyor belt 12 which protrude laterally beyond the marginal portions of the lower cover foil 19 are protected against the spray of foam material by the said marginal strips 24, 25. When the marginal strips move into the foaming chamber, the said strips are folded upwardly by the supporting means 28 which have their end faces somewhat inclined so that the foam material will not stick to the supporting means. The foam material is so adjusted that it will firmly stick to the cover foils. The quantity of the foam material, the length of the foaming path, and the speed of the rotating conveyor belts are tuned to each other in such a way that at the end of the foaming path the foam material reaches the upper cover foil and firmly adheres thereto. Depending on where the foam material first reaches the upper cover foil, forces build up which have the tendency to displace the cover foils relative to each other. This is made possible by the free movability of the cover foils with regard to the conveyor belts. Excessive foam material which is caused by the unavoidable nonuniformities occurring during the deposit of the foam material, can escape outwardly through the narrow gap between the supporting means 28 and the upper cover foil 21 past the marginal strips 24, 25. In this way, a compacting of the foam material will be avoided and thus the specific weight of the obtained product will be kept low.

At the end of the foaming path, a uniformly high and densely coated web of foam material is obtained the marginal portions of which are trimmed by the cutting knives 32. During this operation, the marginal strips 24, 25 are likewise partially cut off, said marginal strips 24, 25 merely having functioned as aid against sticking of the foam material to the lower conveyor belt 12 and supporting means 28. If a narrow strip should still exist on the lower cover foil 19, it will drop off or be torn off. Subsequently, the web of foam material will be cut to length. If after producing plate material of a certain width, it is desired to change the width of the plates, the supporting means 28 are moved apart or toward each other in a corresponding manner. If a different height of the plates is desired, it is merely necessary to exchange the supporting means 28 against correspondingly high supporting means. The supporting means 28 may also be fixedly connected to the lower conveyor belt 12. The upper conveyor belt 13 may be discarded when the roller 15 is replaced by a reversing roller.

It is, of course, to be understood that the present invention is, by no means, limited to the particular method and apparatus described above.

What I claim is:

1. A method of making in a continuous process polyurethane foam sheet material covered on opposite sides by foils, which includes the steps of: providing a moving endless conveyor belt as support for the sheet material to be formed, said conveyor belt having lateral marginal portions respectively feeding two marginal strips of thin material upon the lateral marginal portions of said conveyor belt, feeding a first thin cover foil over and placing the same onto both of said marginal strips, feeding a second cover foil in substantially parallel but spaced relationship to and over said first cover foil, introducing foamable polyurethane material between said first and second cover foils while causing said foamable material to foam so as to have fully reacted before leaving said conveyor belt, and allowing excessive foam material between said cover foils while still on said conveyor belt to escape from between said cover foils.

2. A method according to claim 1, in which said marginal strips are so placed on said conveyor belt that the lateral outward portion of said marginal strips is first folded upwardly and then outwardly.

3. An apparatus for making in a continuous process polyurethane foam sheet material covered on opposite sides thereof by foils, which includes: an endless movable conveyor belt forming lower supporting and feeding means for a lower cover foil intended to cover one side of the foam sheet material to be produced, upper supporting means arranged above and in vertically spaced relationship to said lower supporting means for feeding an upper cover foil over the foam sheet material to be produced, means adjacent the incoming end of the upper conveyor belt section for depositing foam material from which said sheet material is to be made between said lower and upper supporting means after the cover foils have been introduced therebetween, and lateral supporting and guiding means laterally defining the space between said upper and lower supporting means for receiving the foam material from which the sheet material is to be made, said lateral supporting and guiding means being so located as to permit excessive foam material between said upper and lower supporting means to escape toward the outside.

4. An apparatus according to claim 3, in which said supporting and guiding means taper outwardly in the longitudinal direction of said endless conveyor belt adjacent said incoming end of the upper conveyor belt section.

5. An apparatus according to claim 3, which includes supporting plate means below the upper section of said endless conveyor belt, and in which said supporting and guiding means extend over the entire length of said supporting plate means.

6. An apparatus according to claim 3, in which said upper supporting means is likewise formed by a movable endless conveyor belt.

7. An apparatus according to claim 3, in which said supporting and guiding means are adjustable in a direction transverse to the longitudinal direction of said conveyor belt.

8. An apparatus according to claim 3, in which said supporting and guiding means are detachable.

9. An apparatus according to claim 3, in which said supporting and guiding means are fixedly connected to said endless conveyor belt.

10. An apparatus according to claim 3, in which said upper supporting means is formed by roller means.

References Cited

UNITED STATES PATENTS

| 3,041,224 | 6/1962 | Sherts et al. | 264—45 |
| 3,093,232 | 6/1963 | Kornylak | 264—45 |
| 3,123,856 | 3/1964 | Dye et al. | 264—47 |
| 3,187,069 | 6/1965 | Pincus et al. | 264—45 |

JULIUS FROME, *Primary Examiner.*

LEON GARRETT, *Assistant Examiner.*

U.S. Cl. X.R.

18—4, 5; 264—45, 51